United States Patent
Clark et al.

(10) Patent No.: US 10,380,467 B2
(45) Date of Patent: Aug. 13, 2019

(54) SYSTEMS AND METHODS FOR TRANSIT INDUSTRY VEHICLE RIDER ACCESSORY CAPACITY MONITORING

(71) Applicant: Trapeze Software Group Inc., Cedar Rapids, IA (US)

(72) Inventors: Dan Clark, Cedar Rapids, IA (US); Jacob Gondek, Mount Vernon, IA (US); Stephen Kelly, Marion, IA (US); Kristi Urich, Swisher, IA (US); Sharon Ann Irma Barnes, Scottsdale, AZ (US); Marty Charles Brooks, Scottsdale, AZ (US)

(73) Assignee: Trapeze Software Group Inc., Cedar Rapids, IA (US)

( * ) Notice: Subject to any disclaimer, the term of this patent is extended or adjusted under 35 U.S.C. 154(b) by 15 days.

(21) Appl. No.: 15/827,069

(22) Filed: Nov. 30, 2017

(65) Prior Publication Data

US 2018/0157945 A1    Jun. 7, 2018

Related U.S. Application Data

(60) Provisional application No. 62/429,290, filed on Dec. 2, 2016.

(51) Int. Cl.
| G06K 17/00 | (2006.01) |
| G06K 7/10 | (2006.01) |
| G06K 19/07 | (2006.01) |
| B60R 9/10 | (2006.01) |
| G06Q 50/30 | (2012.01) |
| G06K 19/073 | (2006.01) |

(52) U.S. Cl.
CPC ............ *G06K 17/0022* (2013.01); *B60R 9/10* (2013.01); *G06K 7/10297* (2013.01); *G06K 7/10415* (2013.01); *G06K 19/0723* (2013.01); *G06K 19/07327* (2013.01); *G06Q 50/30* (2013.01)

(58) Field of Classification Search
CPC ......................... G06Q 10/087; G06Q 10/0785
USPC ......................................... 235/385, 375, 487
See application file for complete search history.

(56) References Cited

U.S. PATENT DOCUMENTS

| 2003/0137435 | A1* | 7/2003 | Haddad | G08G 1/127 340/994 |
| 2007/0000962 | A1* | 1/2007 | Reeves | B60R 9/06 224/536 |
| 2009/0256707 | A1* | 10/2009 | Uschold | B60R 9/04 340/568.1 |
| 2009/0320713 | A1* | 12/2009 | Amiri | B61B 13/00 104/281 |
| 2013/0041941 | A1* | 2/2013 | Tomasic | G08G 1/123 709/203 |

* cited by examiner

*Primary Examiner* — Edwyn Labaze
(74) *Attorney, Agent, or Firm* — Warner Norcross + Judd LLP

(57) ABSTRACT

Systems and methods for transit industry vehicle rider accessory capacity monitoring whereby an RFID tag, or other 'determining' technology, indicates the presence or absence of a rider accessory in an accessory storage and such presence or absence is communicated and received by a transit industry vehicle to be disseminated to users of such systems and methods.

21 Claims, 5 Drawing Sheets

SYSTEMS AND METHODS FOR TRANSIT INDUSTRY VEHICLE RIDER ACCESSORY CAPACITY MONITORING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Transit agencies have begun offering their riders the ability to bring their bikes, and other accessories ("rider accessories"), with them on trips on the transit agencies' network of transit vehicles (such as buses, trains, and the like). In some cases the rider accessories are brought directly onto the transit vehicle. Sometimes there are designated areas for the rider accessories, such as bike racks on the front of the transit vehicles ("accessory storage") or inside them. However there is a limited amount of accessory storage for a particular rider accessory (i.e. each transit vehicle has a "rider accessory storage capacity" for each rider accessory, even if it's zero or presumed to be zero in the absence of an explicit rider accessory storage capacity). As rider accessories become more prevalent, especially to assist in addressing the challenges of "the last mile" for transit riders, or last minute decisions to take transit, it is increasingly important to know, in advance whether a particular transit vehicle can (or is likely to be able to) accommodate a particular rider accessory. As such, some are attempting to connect a wired sensor to a vehicle mobile data terminal ("MDT"). While reliable for communication, these approaches are cumbersome, difficult to install, and expensive. Further existing approaches do not allow acceptance and dissemination of information related to rider accessory storage capacity ("rider accessory storage capacity information").

There thus remains a need for a solution that addresses the shortcomings in current rider accessory capacity monitoring systems.

SUMMARY OF THE INVENTION

There is a system for transit industry vehicle rider accessory capacity monitoring for a transit industry vehicle comprising: an accessory storage device, located on the transit industry vehicle, configured to store an accessory; a determining device, configured to: determine the presence of an accessory in the accessory storage device; a communicating device, configured to: communicate the presence of an accessory in the accessory storage device.

The accessory may be a bike.

The determining device may be located inside the transit industry vehicle remote from the accessory storage device.

The accessory storage device may be a bike rack, the accessory may be a bike, the determining device may be an RFID tag and the communicating device may be the RFID tag.

The RFID tag may be mounted on the accessory storage such that when the accessory storage is in an extended position the RFID can communicate and when the accessory storage is in a retracted position the RFID cannot communicate.

The system may further comprise an on-board computer, located in the transit industry vehicle, and may be configured to: receive the presence of an accessory in the accessory storage device from the communicating device; and provide the presence of an accessory in the accessory storage device to a sink.

The system may further comprise one or more request sources configured to: request, from the sink, the capacity for the accessory storage device; and receive, from the sink, the capacity for the accessory storage device.

The request source may be a rider communication device of a rider having an accessory for storage in the accessory storage device.

There is further a method for determining an available capacity of an accessory storage device on a transit industry vehicle, the method comprising: making a request, by a request source, for the available capacity of the accessory storage device on the transit industry vehicle, processing an accessory capacity RFID signal to determine the available capacity of the accessory storage device on the transit industry vehicle; and disseminating, by a mobile data terminal on the transit industry vehicle to a response sink, a response to the request, the response further comprising the available capacity of the accessory storage device on the transit industry vehicle.

The processing may further comprise: determining, by a determining device, whether an accessory is in the accessory storage device; communicating, by a communicating device, the presence of an accessory in the accessory storage device to the mobile data terminal via the accessory capacity RFID signal; receiving, by the mobile data terminal, the accessory capacity RFID signal; and updating, in storage on the mobile data terminal, the available capacity of the accessory storage device based on the accessory capacity RFID signal.

The accessory storage device may be a bike rack, the determining device may be an RFID tag and the communicating device may be the RFID tag.

The bike rack may have an accessory arm that has a retracted position, whereby no bike is present, and an extended position, when a bike is present in accessory storage and the accessory arm extends over a bike tire and holds the bike tire on the accessory storage device, and the RFID tag is mounted on the accessory arm such that when the accessory arm is in an extended position the RFID tag can communicate an accessory present signal as the accessory capacity RFID signal and when the accessory storage is in a retracted position the RFID tag cannot communicate.

The accessory storage device may be a bike rack, the determining device may be an RFID tag assembly comprising an RFID tag and a sensor that indicates the presence of a bike in the bike rack to the RFID tag, and the communicating device is the RFID tag.

The bike rack may have an accessory arm that has a retracted position, whereby no bike is present, and an extended position, when a bike is present in accessory storage and the accessory arm extends over a bike tire and holds the bike tire on the accessory storage device, and the sensor a tilt sensor that indicates the presence of the bike in the bike rack when the accessory arm is in an extended position.

The request may further comprise a reservation request, for a space on the accessory storage device, and the response may further comprise an indication of whether a space is available.

The bike rack may further have a lock that prevents a bike from being inserted, the indication may include a key to unlock the lock to allow a bike to be inserted and wherein the request may be made via an application on a rider computing device and the key is sent to the rider computing device.

There is also a bike rack for transporting a bike on a transit industry vehicle comprising: a base, connected to the transit industry vehicle; a tire tray, connected to the base, that a bike tire rests on when the bike is in the bike rack, wherein the tire tray is configured to restrict lateral movement and downward movement of the bike tire; an accessory arm, pivotally connected to the base, and pivoted between a retracted position when no bike is present and wherein the accessory arm is stowed in a retracted position close to the base, and an extended position when a bike is present in the bike rack with a bike tire resting on the tire tray and the accessory arm extends over the bike tire and holds the bike tire in the tire tray; a determining device, configured to indicate when the accessory arm is in the extended position.

The determining device may be an RFID tag, located at a tag location on the accessory arm, that is in range of a tag reader when the accessory arm is in the extended position and out of range of the tag reader the accessory arm is in the retracted position.

The accessory arm may further comprise an arm sleeve, located radially around and enveloping the accessory arm and providing an RFID shield for a portion of the accessory arm that is enveloped, such that when the accessory arm is in the retracted position the tag location is in the portion and when the accessory arm is in the extended position the tag location is outside of the portion.

The RFID tag may be further configured to communicate the presence of an accessory in the accessory storage device to a tag reader.

The determining device may be a sensor that generates an accessory present signal or an accessory not present signal.

The communicating device may be configured to communicate the accessory present signal or the accessory not present signal to a tag reader.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENT

Figure 1:
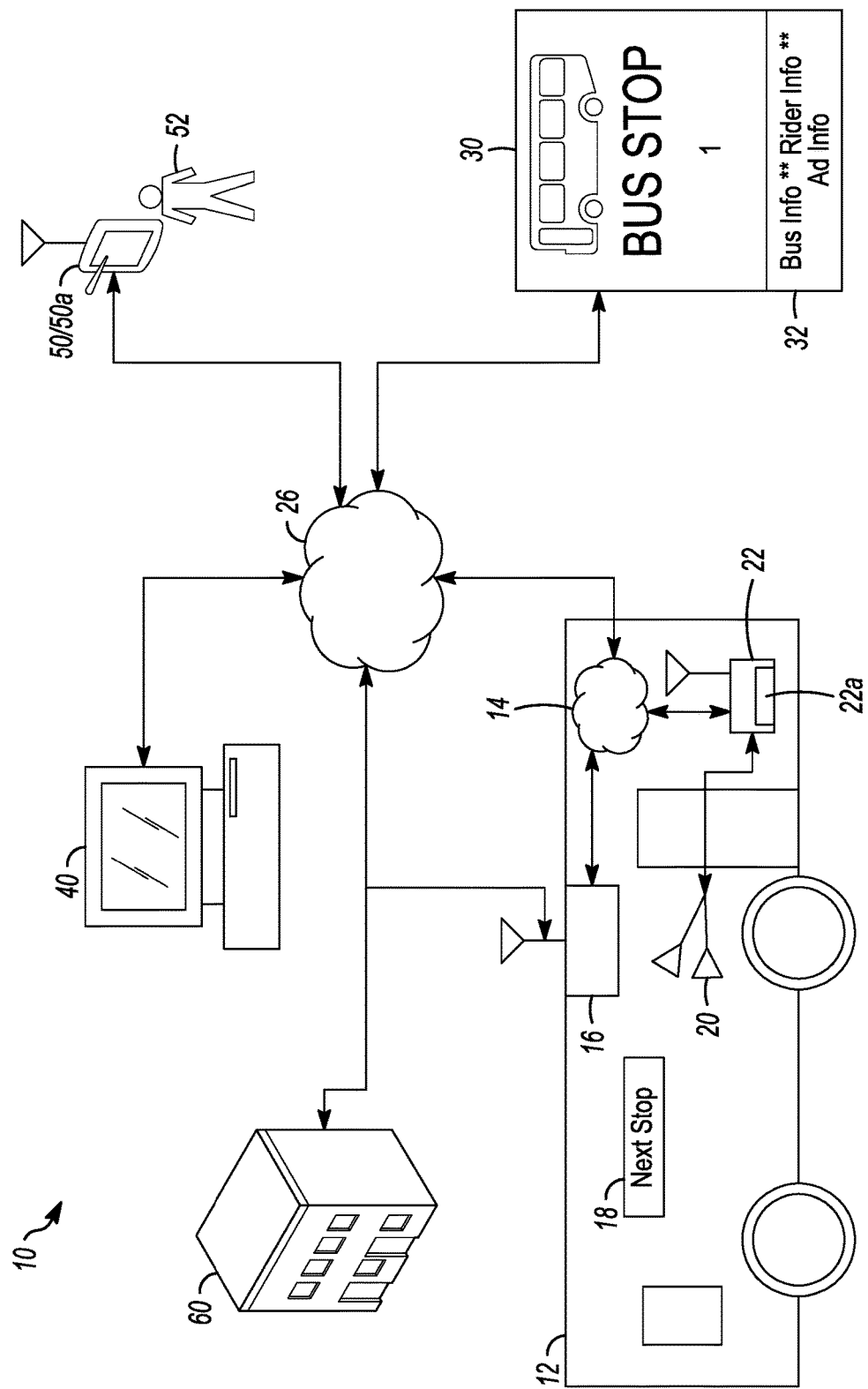
FIG. 1 is a diagram of a system for rider accessory capacity monitoring systems according to a non-limiting embodiment.

FIG. 1 is a diagram of a system 10 for transit industry vehicle accessory capacity monitoring comprising transit industry vehicle (TIV) 12, further comprising vehicle area network 14, router 16, next stop display 18, one or more TIV inputs/outputs (TIV IO) 20, mobile data terminal (MDT) 22 (which may traditionally have both a display and the 'computer' and processor, or MDT 22 may be more akin to a two-part solution having a display and a separate 'computer' which may be an integrated vehicle logic unit "IVLU") and accessory storage 70, communication network 26, transit agency server 40, transit stop 30 and transit information sign 32, rider computing devices (RCD) 50 for rider 52 who has an accessory 54 (such as a bike, not shown).

TIV 12 may be a bus, train, car, paratransit vehicle, and the like. TIV may be operated by a driver of a transit agency, or a third party, such as a third party contractor, or even individuals who are driving such vehicles, or may be operated without a driver. TIV 12 may have a schedule (such as arriving at various fixed stops such as transit stop 30) and may be part of a schedule of various transit agency services (such as other buses, trains and the like) that offer rides to riders 52, optionally with accessories. TIV 12 has many systems running thereon (with various inputs and outputs "I/O" 20), as known in the art, such as engines, brakes, audio announcement technology (such as transit stop announcements that may be displayed via next stop display 18 or announced via an audio announcement), signage, passenger counting, and the like (each a "TIV System", some not shown) and may have a vehicle area network 14 to assist in communication between I/O, TIV Systems and MDT 22, including via router 16. Each TIV 12 may have one or more capacities for each of a one or more accessory type. For example TIV001 may have total capacity for 2 bikes and 1 scooter (and may have available capacity of 1 bike and 0 scooters if the other spots are already used), while TIV002 may have total capacity for 3 bikes (and may have available capacity of 2 bikes as 1 bike is already stored thereon). Such capacity information may be stored on transit server and/or MDT 22 (for example MDT 22 may only store accessory capacity information for itself, to save memory) and may be exchanged therebetween (via communication network 26 for example) for further dissemination, as described herein.

MDT 22 is an on-board computing device used by a driver of TIV 12 to access or perform transit functionality (GPS and route information, vehicle diagnostics, schedule information and adherence, accessory capacity monitoring and information storage, and the like). Exemplary MDTs 22 may include tablets running MDT applications 22a that provide transit functionality and may include Ranger™, CMDTII™, and Touch MDT™ by Trapeze™, and 'two-part' on-board computing devices such as Pentium™ IVLU, C-IVLU, VE-IVLU, VI-IVLU and V8-IVLU. MDT 22 may include (or system 10 may separately have) an RFID tag ("MDT RFID tag" or reader tag, not shown) or RFID gateway (not shown) such that RFID tag 220 can communicate with MDT 22 (either directly or via the separate MDT RFID tag or RFID gateway, and in a wired or wireless fashion) and MDT 22 can then use the information in the RFID signal, as described herein. MDT 22 may be placed near the driver of the vehicle and may be oriented such that communication with RFID tag 220 is possible.

RFID tag 220 (or "tag" 220) may provide an RFID signal that can be used to indicate capacity of an accessory storage. RFID signal may contain, for example, a tag identifier and a timestamp and MDT 22 may be set to listen for signals from a particular one or more tag identifiers that are known to be on accessory storage 70 on TIV 12 on which the MDT 22 is. For example, the presence of an RFID signal may indicate an accessory/bike is in accessory storage 70.

Tag 220 may be either active (having a power source and generally thus able to transmit an RFID signal according to its own parameters such as frequency and transmission power) or passive (having no power source and being powered via energy transmitted from an RFID reader such as MDT RFID tag or gateway). The selection of active/passive, characteristics of the hardware (such as antenna size and the like), and the parameters for an active tag 220 (and its transmissions) may vary according to the physical layout of the implementation, for example the distance and angles between tag 220 and gateway/reader (where a longer distance may require a more sensitive antennae), what materials are between them (a front windshield for example), and the like.

RFID tag 220 (shown in FIG. 3A) may comprise many underlying elements (not shown), such as microcontroller unit (MCU), accelerometer and transceiver, any or all of which may be operably connected, for example to allow any required communication there between, battery, which may be operably connected to the other components in tag 220 to act as a power source for these other components for active tags 220. MCU may control operation of tag 220, determining when tag 220 should perform specific operations, such as communication, and directing the operations of accelerometer and transceiver. MCU further comprises clock, memory, central processing unit (CPU) and input/output ("I/O") control unit, and may comprise or house accelerometer and/or transceiver depending on hardware implementation details.

Transit agency server 40 may be at a transit agency, and may have further systems that form part of the overall system enabling one or more forms of transportation for a transit agency. Transit agency server 40 may allow supervisors or schedulers to determine (such as via scheduling functions), staff (such as via the creation of runs and assigning drivers) and monitor (such as schedule adherence, accessory storage and capacity, vehicle safety and performance, and the like) routes, vehicles and other assets and aspects of a transit agency. Transit agency server 40 may further disseminate any of such information to other elements of system 10. Transit agency server 40 may be implemented via one or more software components (including applications and database components, for example), hardware components (including processors, RAM, ROM and the like, which may be part of many elements of system 10), and may be used by one or more transit agencies or fleet operators.

Communication network 26 may be substantially any combination of any public or private network, wired or wireless, and may be substantially comprised of one or more networks that may be able to facilitate communication between themselves.

Rider computing devices (RCD) 50 may be substantially any computing device (such as a tablet, mobile smart phone, laptop, etc.) that allows a rider 52 to access and interact with system 10. RCD 50 may have one or more applications thereon, including a rider transit application (RTA) that may provide functionality relating to the transit services of one or more transit agencies (such as trip planning, schedule adherence information, ticketing and fare payment, and the like). RCD 50 may have GPS technology (to allow RCD 50 to obtain its GPS location, which may be a rider GPS location), camera technology, and other technology available on such devices. RCD 50 and rider 52 may be referred to somewhat interchangeably herein; generally a rider/RCD pairing (i.e. that a rider 52 will have a RCD 50 that they will carry and use to interact with system 10) will mean that such references apply.

RCD-A 50a is an application residing on RCD 22. RCD-A 22a largely controls RCD 22, including its operation and communication with other aspects of system 10. RCD-A 22a may be configured to present one or more screens (which may include output and input user interface elements) to a user of RCD 22, or otherwise accept or provide input or output (such as via sounds, vibrations, and the like), to enable to functionality described herein. RCD-A 50a may be a computer program product, comprising a computer usable medium and having a computer readable program code thereon adapted to perform the functionality as described herein.

Exemplary functionality of RCD-A may include:
(a) Accepting an input, or otherwise determining (such as via a speed of travel of rider 52) whether rider 52 wants to use transit services and whether they have an accessory, such as a bike. For example, a rider may have planned a route then be on their way to the appropriate bus stop 30. They may indicate they are riding a bike and want to make sure TIV 12 they are to get on at bus stop 30 has capacity for their bike.
(b) Receiving capacity information for TIVs 12. The TIVs 12 whose capacity may be received by RCD-A may include TIVs that are close by, TIVs 12 that are part of, or related to, a trip plan that rider 52 is following, and the like.

Transit stop 30 may be a location where a rider may get on or off of TIV 12. Such may include stops, transfer locations, stations, and the like. Transit information sign 32 may be located at or near transit stop 30 and may display information relating to a transit agency's transit services, such as routes, route and schedule adherence, rider information, advertising information, accessory capacity information (such as how much capacity the arriving TIVs 12 have for a particular accessory such as a bike) and the like. Transit information sign 32 may be able to communicate with other elements of system 10, for example via communication network 26.

Transit station 60 may be a location where a rider may get on or off of TIV 12 and may transfer between TIV 12 and even between transit agencies. Transit station 60 may have one or more station signs that may be similar to transit information sign 32 and may be more sophisticated and complex.

Accessory capacity information sink ("sink" or "response sink") 80 may be any element of system 10 that is an endpoint for capacity information or reservation requests responses (such as accessory capacity information for one or more TIVs 12 for one or more accessories). This may be a bus stop 30, RCD 50, or transit agency server 40, for example. Sink 80 may receive the accessory capacity information via one or more intermediaries 90. For example, TIV 12 may obtain updated accessory capacity information (for example a bike is placed on accessory storage 70 and tag 220 provides RFID capacity information to gateway and then to MDT 22, MDT 22 may then provide it to transit server that acts as the intermediary for a sink that is RCD 50 (for example for efficiency and/or as sink preferences may be stored at transit server 40).

Accessory storage request source ("request source") 90 made be any element of system 10 that is an originating point for requests about capacity information and/or for making reservations. This may be a bus stop, RCD 50 or transit agency server 40, for example. Request source 90 may send the request via one or more intermediaries 90. For example, transit station 60 may know that a particular TIV 12 is about to pull into a particular bay and may wish to display on a sign what capacity it has. Or a user may, via RCD 50, request a particular space be saved for them. This request may be directly to transit agency server 40, who may have and directly send back that information (a "response" to the request). Alternatively such request may be to transit agency server 40 who then makes the request to TIV 12.

Accessory storage 70 is a device to store one or more accessories or accessory types. Accessory storage 70 may comprise accessory base 216 that may connect to transit industry vehicle 12, as known in the art, tire tray 202 (for example a front tire tray and a rear tire tray) connected to base 216, and accessory arm 204 pivotally connected to base 216. Accessory arm 204 may comprise arm sleeve 206, tire brace 208, RFID shielding 210 and tag location 214.

Figure 2A:
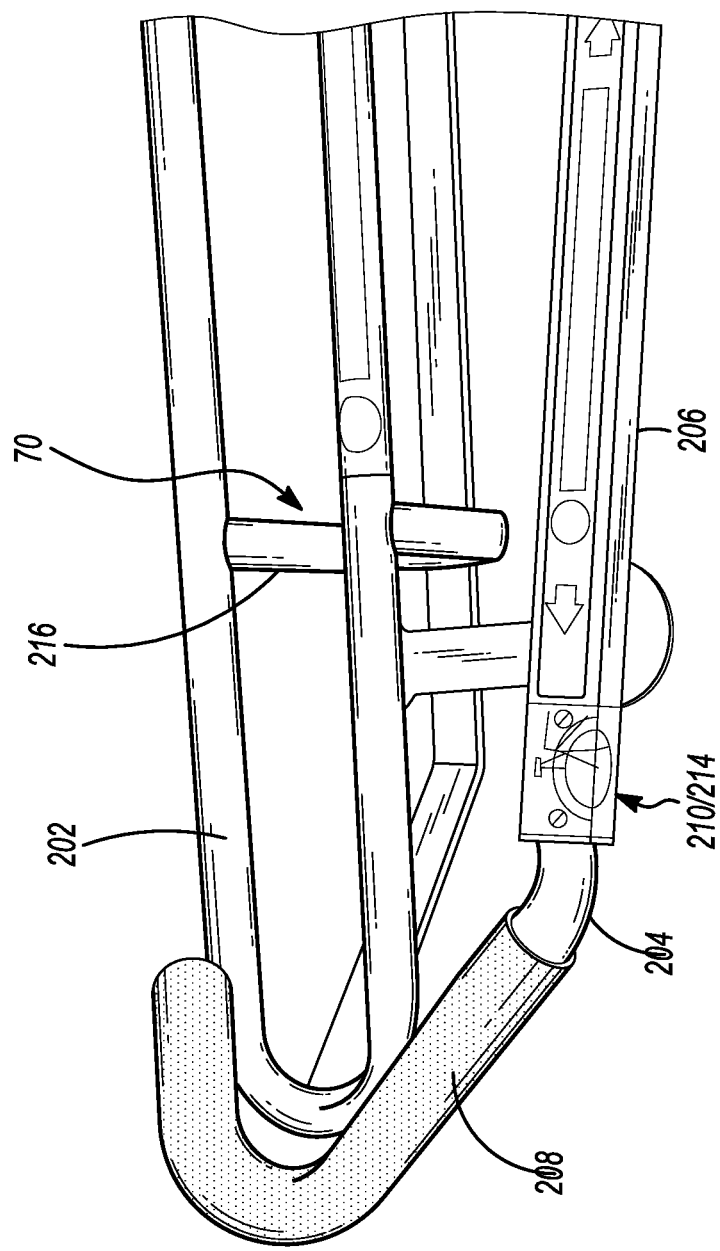
FIG. 2A is a diagram of a bicycle storage accessory with the arm in a retracted position according to a non-limiting embodiment.

As shown in FIG. 2A, accessory arm 204 may have a retracted position, whereby no bike is present and accessory arm 204 is stowed in a retracted position close to accessory base 216.

Figure 2B:
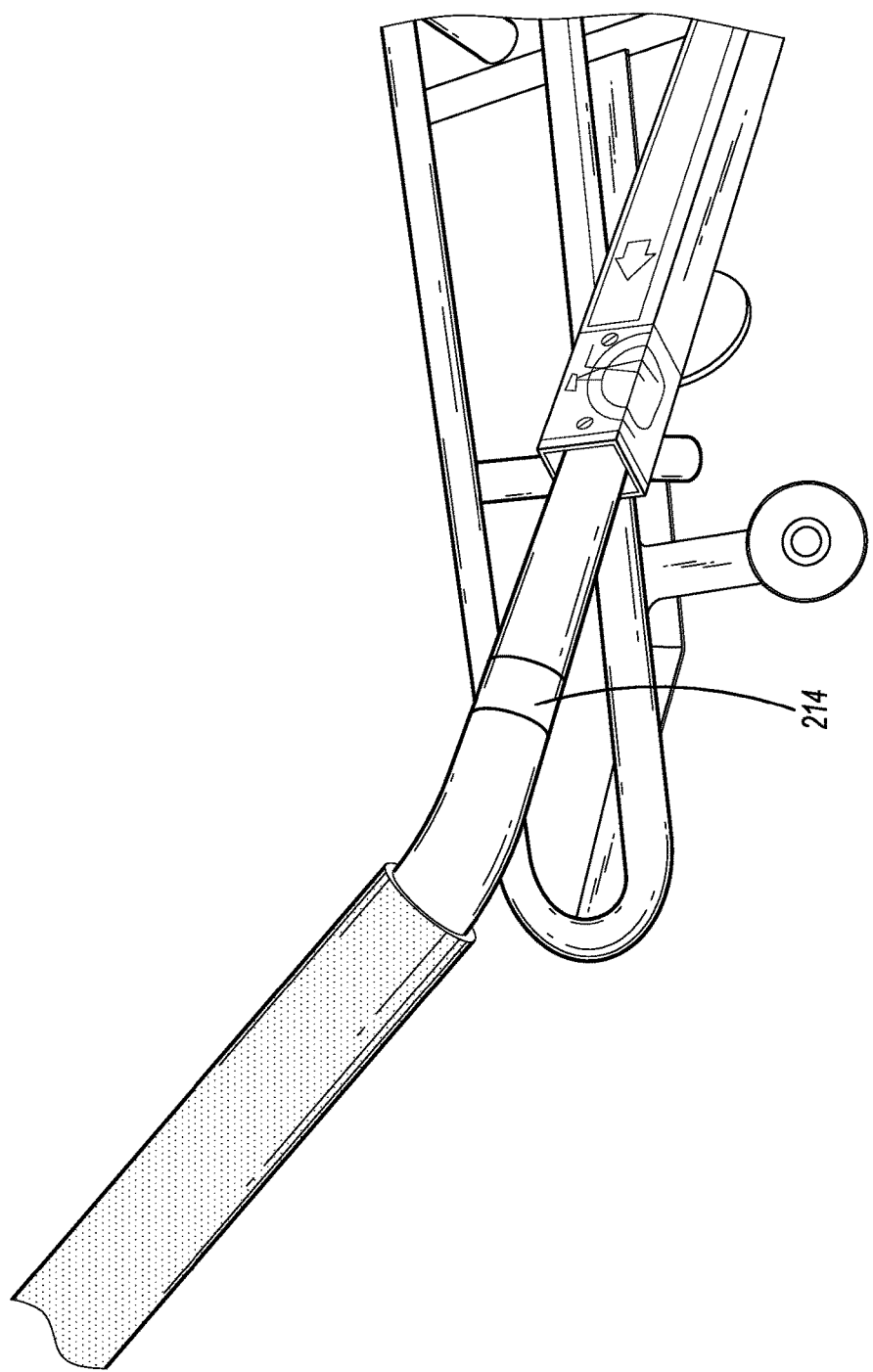
FIG. 2B is a diagram of a bicycle storage accessory with the arm in an extended position according to a non-limiting embodiment.

As shown in FIG. 2B, accessory arm 204 may have an extended position, when a bike is present in accessory storage. In such position a bike tire may rest on and in tire tray 202 (where tire tray 202 may substantially limit the tire's lateral movement and prevent downward movement of tire). Accessory arm 204 may then be pivotally raised (for example manually) such that tire brace 208 extends over bike tire and holds the bike tire in position in tire tray 202.

Exemplary accessory storage 70 (including the retracted position and extended position but without capacity monitoring and RFID features herein) may include Apex 3™ VeloPorter 2™, SwingLock™ and Interlock™ bike racks, all by Sportsworks™, and other accessory storage devices developed by other companies. The method of attaching/connecting such accessory storage 70 to TIV 12, and accessories 54 thereto, may be substantially as known in the art or developed.

Tag location 214 may be where RFID tag 220 is placed. Tag location 214 may be disposed along the length of accessory arm 204 such that when in the retracted position tag location 214 may be covered or enveloped by accessory arm sleeve 206 (thus accessory arm sleeve 206 may be preventing or blocking the RFID signal being sent by RFID tag 220 such that it is not received by other components of system 10 such as another tag, a gateway and/or MDT 22) but when in the extended position tag location 214 may be outside of the coverage of accessory arm sleeve 206, (thus accessory arm sleeve 206 thus not preventing or blocking the RFID signal ("accessory present signal") being sent by RFID tag 220 such that it is received by other components of system 10, as described herein). Tag location 214 may be located radially around accessory arm 204 such that in the extended position tag location 214, and thus RFID tag 220, are oriented to most effectively communicate with the desired element(s) of system 10.

RFID shielding 210 is an optional feature of accessory storage 70. RFID shielding 210 may assist in preventing or blocking an RFID signal from RFID tag such that no signal is detected by system 10. RFID shielding may be disposed overtop of accessory arm sleeve 206, around tag location 214. RFI shielding 210 may be used when the properties of a particular implementation require additional shielding such that a signal (indicating a bike is present) is not received by system 10 when accessory arm 204 is in a retracted position (i.e. when a bike is not present).

Thus, as described, the RFID signal from RFID tag 220 may indicate that a bike is present. Of course it is to be understood that the reverse could be implemented, such that tag location 214 may be selected on accessory storage such that when a bike is not present an RFID signal ("accessory not present signal") is received by elements of system 10 (though this may be less desirable as receiving and processing additional RFID signals may not be desirable and it is expected that accessory storage 70 may be empty more than occupied).

FIGS. 2A and 2B describe one approach to i) determine whether an accessory is present (a de facto RFID sensor that is exposed or in range only when a bike is present) ("Determining") and ii) communicate the determination that an accessory is present. Of course, there are many other approaches to accomplishing ("Communicating").

Determining may be accomplished by any sensor signal (such as from sensors such as those below) that generates an accessory present signal or an accessory not present signal. Exemplary "Determining", performed by such determining devices below, may include:

(a) For example tag 220 may have an accelerometer thereon and if the measured acceleration matches a profile of accessory arm 204 being raised from a retracted position to an extended position then tag 220 may send an accessory present signal. Alternatively other RFID approaches may be taken, with a goal of not changing the current process of putting accessory 54 into accessory storage 70 (i.e. lifting accessory arm 204 occurs now, thus the "signal present" approach herein does not alter existing processes).

(b) Pressure sensors located on tire brace 208 such that when it is in contact with a tire RFID communication occurs;

(c) A photo sensor positioned such that when accessory arm 204 is extended light may hit the photo sensor and trigger communications. This may include or involve a solar cell that could charge up a power source for tag 220 making tag 220 semi-active and is able to communicate based on such power;

(d) A tilt sensor so when the arm is up it will trigger communication (provided that this may require a battery to power the sensor);

(e) Optical/vision systems, for example on the transit industry vehicle that may 'see' the accessory itself or may 'see' a marker on accessory storage 70 when a bike is present (for example, pattern recognition, colored labels in particular locations relative to the geography of a bike being present, LEDs or reflective surfaces).

Exemplary "Communicating", performed by such communicating devices and approaches, may include:

(a) RFID, such as via tag 220 (where tag 220 may be considered a dual purpose device that determines and communicates, in the case of tag 220 whereby communicating or lack thereof may constitute the determining or a separate sensor may be used to determine such that tag 220 may not be considered dual purpose);

(b) Bluetooth devices on accessory 70 and optionally connected to whatever performs the Determining, with a Bluetooth component on transit industry vehicle (such as part of MDT 22);

(c) "coupled" Communicating whereby the element performing the Determining is on the bus and thus Communicating is not separately required (for example optical/vision systems installed on the vehicle, where such may be connected to on-board computer systems (such as IVLU and/or MDT 22) by traditional approaches.

Figure 3B:
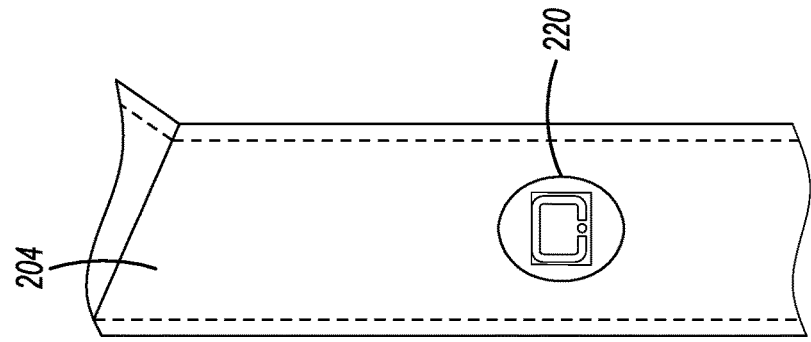
FIG. 3B is a front view of an RFID tag installed on an accessory arm of an accessory storage according to a non-limiting embodiment.
Figure 3A:
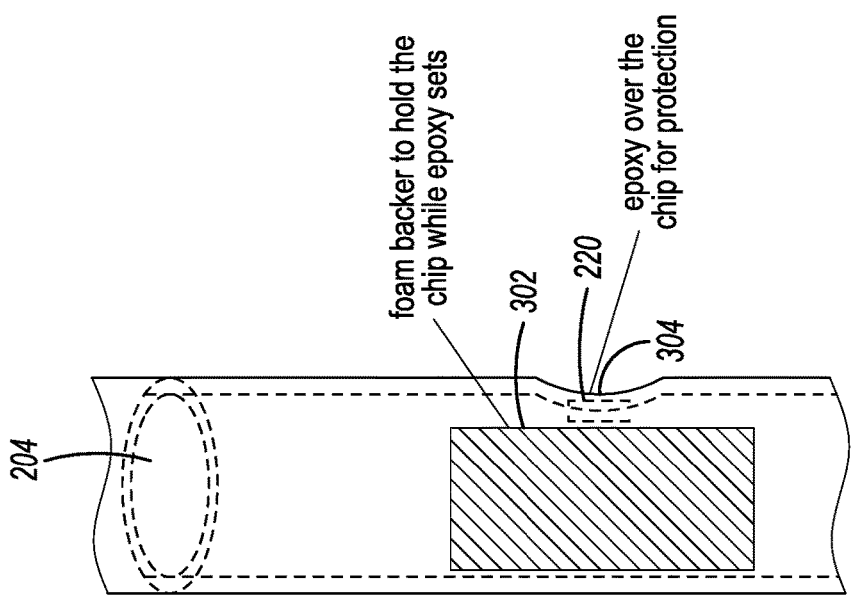
FIG. 3A is a profile view of an RFID tag being installed on an accessory arm of an accessory storage according to a non-limiting embodiment.

FIGS. 3A and 3B are diagrams of an installation method for tag 220 into accessory arm 204. As shown in FIG. 3A a hole may be cut into accessory arm 204. A foam backer 302 may be inserted into accessory arm, where foam backer 302 is appropriately sized such that its expansion allows tag 220 to be held in place but not pushed out of the space caused by cutting the hole. Epoxy 304 may be applied over tag 220 and rendered substantially flush to accessory arm 204 where the cut portion of accessory arm 204 was. Alternatively, tag 220 may be embedded in foam backer 302 to achieve a similar result. Foam backer 302 may be left in or removed. FIG. 3B shows a potential orientation of tag 220 once installed. The configuration may depend on dimensions and orientations between the reader and tag 220.

Other approaches and methods for installing tag 220 are also possible. For example, a rubber plug may be inserted into a hole drilled in accessory storage 70, with tag 220 optionally being on the inside surface and thus not exposed to elements. If a solar cell is used to power tag 220, such solar cell may be on a surface of the rubber plug that is exposed to sunlight and thus not interior to accessory storage 70.

Figure 4:
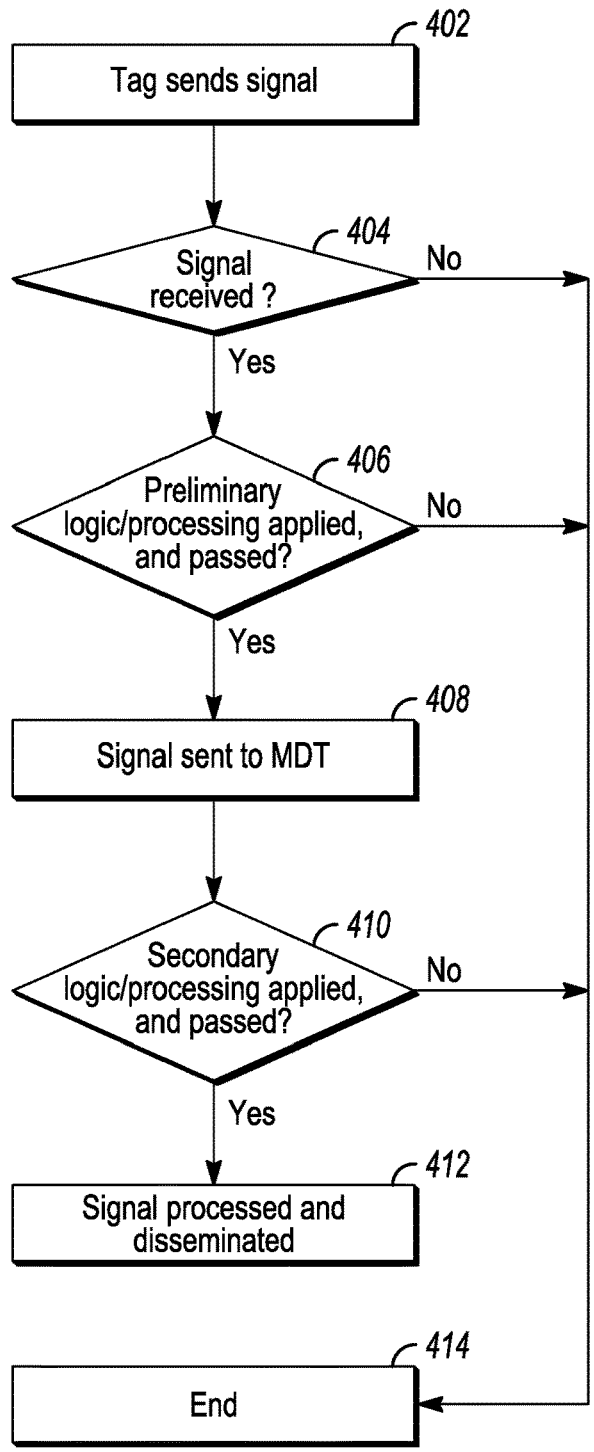
FIG. 4 is a method for processing an accessory capacity RFID signal according to a non-limiting embodiment.

FIG. 4 is a method 400 for processing an accessory capacity RFID signal.

Method 400 begins at 402 where RFID tag 220 provides a signal, either actively or passively, and somehow with the possibility that such signal identifies the presence or absence of an accessory 54 on accessory storage 70 (via shielding, accelerometer movement, and the like).

If the signal is not received by a reader (gateway, MDT RFID tag, MDT, or the like—an RFID reader) then method 400 ends at 414, thus such scenario is not further contemplated.

At 404 the signal is received. This may be via gateway, reader tag, or MDT 22 for example. It will be understood that at 404 the reader may be listening for a signal, and waiting to act on the signal; if no signal is received then method 400 may "end"—though that may simply mean that the reader continues to listen.

At 406 preliminary processing is done (though this is an optional step and need not be performed). This step may be more likely to occur if it may be desirable to provide more accurate signals from the recipient of the RFID signal before such is passed along—for example a reader tag may receive the RFID signal and do preliminary processing before providing such signal to MDT 22. Preliminary processing may be with a view of removing any 'false' signals—for example if a bump on the road makes RFID signal suddenly, and briefly, be unreadable by the reader preliminary processing may indicate to wait for a few seconds to confirm the signal is truly unreadable and gone. Preliminary processing may deal just with processing of the RFID signals and other predecessor RFID signals.

If preliminary processing indicates no signal should be passed along then method 400 ends at 414. Otherwise method 500 continues to 508 where the reader may provide the signal to MDT 22, such as via a wired connection between reader tag/gateway and MDT 22.

At 408 the signal is sent to MDT 22.

At 410 secondary processing is done (though again, this is an optional step and need not be performed, particularly if preliminary processing is done). Again, the processing is to ensure the removal of false positives, false negatives, and any RFID signals that do not reflect a signal that validly impacts system 10, such as changes to accessory capacity. Secondary processing may involve using data, other than RFID signals, to assess whether the current RFID signal being considered should be processed. Exemplary secondary processing may involve TIV 12 data available on MDT 22. In particular, exemplary MDT data may include motion detection (i.e. if TIV 12 is in motion then a valid change in accessory storage capacity is unlikely), GPS location determination (i.e. if TIV 12 is not near a stop then a valid change in accessory storage capacity is unlikely) and door status (i.e. if the door has recently opened, or opens shortly after a timestamp of the RFID signal, then a valid change in accessory storage capacity is more likely).

If secondary processing filters out the RFID signal (and thus a valid change in accessory storage capacity has not happened) then method 400 ends at 414. Otherwise method 400 continues at 412 where RFID signal and/or resultant information and signals, are processed and/or disseminated. For example, at 412 MDT may update its full set of accessory capacities and send a fully updated set of accessory capacities, including the updated capacity related to the RFID signal just processed, to transit agency server 40. If a new "accessory present signal" is detected then the available capacity for the particular accessory may be decreased by one for the particular accessory storage device or if a new "accessory gone signal" is detected then the available capacity for the particular accessory may be decreased by one for the particular accessory storage device.

Of course it is also to be understood that system 10 may be configured such that RFID signals are only sent and processed to show changes (i.e. going from signal present to signal missing, or the reverse). In such embodiments preliminary and secondary processing may occur but may operate slightly differently, with a central goal of ensuring that changes are in fact changes that should be fully processed by system 10.

Method 400 may also extend to allow locking and reservations of 'spaces' for accessories on accessory storage 70. For example, RCD 50 may be used to request a reservation for their bike on TIV 12, having already found out that such TIV 12 has capacity. Reservations may be accomplished, for example, by a lock on accessory storage 70 that may be enabled and disabled via Bluetooth™. When RCD 50 makes a request it may be granted, for example in a response (that may include an indication of whether a space is available) to the reservation request (which may be part of a request) and a Bluetooth™ 'key' may be provided such that the RCD 50 may unlock accessory storage 70 and insert and/or remove their bike. TIV 12 may always have an override key, for example, that can be used by a TIV operator. Of course a transit agency may charge for use of spaces, or may only charge if a reservation is made. Capacity information may take into account such reservations and/or requests for reservations, to give accurate capacity information to other potential users of such accessory storage 70.

It will be apparent to one of skill in the art that other configurations, hardware etc. may be used in any of the foregoing embodiments of the products, methods, and systems of this invention. It will be understood that the specification is illustrative of the present invention and that other embodiments within the spirit and scope of the invention will suggest themselves to those skilled in the art. All references cited herein are incorporated by reference.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

What is claimed is:

1. A system for transit industry vehicle rider accessory capacity monitoring for a transit industry vehicle comprising:
    an accessory storage device, located on the transit industry vehicle, configured to store an accessory;
    a determining device, configured to determine the presence of an accessory in the accessory storage device; and
    a communicating device, configured to communicate the presence of an accessory in the accessory storage device,
    wherein the accessory storage device has an accessory arm that has a retracted position, when no accessory is present, and an extended position, when an accessory is present in the accessory storage, and the accessory arm extends over and holds the accessory on the accessory storage device,
    wherein the determining device is mounted on the accessory arm such that when the accessory arm is in an extended position the determining device can communicate an accessory present signal and when the accessory arm is in a retracted position the determining device cannot communicate.

2. The system of claim 1 wherein the accessory is a bike.

3. The system of claim 1 wherein the determining device is located inside the transit industry vehicle remote from the accessory storage device.

4. The system of claim 1 wherein the accessory storage device is a bike rack, the accessory is a bike, and at least one of the determining device and the communicating device is an RFID tag.

5. The system of claim 4 wherein the RFID tag is mounted on the accessory arm such that when the accessory arm is in an extended position the RFID can communicate and when the accessory storage is in a retracted position the RFID cannot communicate.

6. The system of claim 1 comprising an on-board computer, located in the transit industry vehicle, configured to receive the presence of an accessory in the accessory storage device from the communicating device; and provide the presence of an accessory in the accessory storage device to a sink.

7. The system of claim 6 comprising one or more request sources configured to request, from the sink, the capacity for the accessory storage device; and receive, from the sink, the capacity for the accessory storage device.

8. The system of claim 7 wherein the request source is a rider communication device of a rider having an accessory for storage in the accessory storage device.

9. A method for determining an available capacity of an accessory storage device on a transit industry vehicle, the method comprising:
    making a request, by a request source, for the available capacity of the accessory storage device on the transit industry vehicle;
    processing an accessory capacity RFID signal to determine the available capacity of the accessory storage device on the transit industry vehicle; and
    disseminating, by a mobile data terminal on the transit industry vehicle to a response sink, a response to the request, the response comprising the available capacity of the accessory storage device on the transit industry vehicle,
    wherein the accessory storage device is a bike rack including an accessory arm that has a retracted position, when no bike is present, and an extended position, when a bike is present in the accessory storage device and the accessory arm extends over a bike tire and holds the bike tire on the accessory storage device,
    wherein an RFID tag is mounted on the accessory arm such that when the accessory arm is in an extended position the RFID tag can communicate an accessory present signal as the accessory capacity RFID signal and when the accessory arm is in a retracted position the RFID tag cannot communicate.

10. The method of claim 9 wherein the processing comprises:
    determining, by a determining device, whether an accessory is in the accessory storage device;

communicating, by a communicating device, the presence of an accessory in the accessory storage device to the mobile data terminal via the accessory capacity RFID signal;

receiving, by the mobile data terminal, the accessory capacity RFID signal; and updating, in storage on the mobile data terminal, the available capacity of the accessory storage device based on the accessory capacity RFID signal.

11. The method of claim 10 wherein the, at least one of the determining device and the communicating device is the RFID tag.

12. The method of claim 10 wherein the determining device is an RFID tag assembly comprising the RFID tag and a sensor that indicates the presence of a bike in the bike rack to the RFID tag, and the communicating device is the RFID tag.

13. The method of claim 12 wherein the bike rack has an accessory arm that has a retracted position, whereby no bike is present, and an extended position, when a bike is present in accessory storage and the accessory arm extends over a bike tire and holds the bike tire on the accessory storage device, and the sensor a tilt sensor that indicates the presence of the bike in the bike rack when the accessory arm is in an extended position.

14. The method of claim 9 wherein the request comprises a reservation request, for a space on the accessory storage device, and the response comprises an indication of whether a space is available.

15. The method of claim 14 wherein the bike rack includes a lock that prevents a bike from being inserted, the indication includes a key to unlock the lock to allow a bike to be inserted and wherein the request is made via an application on a rider computing device and the key is sent to the rider computing device.

16. A bike rack for transporting a bike on a transit industry vehicle comprising:

a base, connected to the transit industry vehicle;

a tire tray, connected to the base, that a bike tire rests on when the bike is in the bike rack, wherein the tire tray is configured to restrict lateral movement and downward movement of the bike tire;

an accessory arm, pivotally connected to the base, and pivoted between a retracted position when no bike is present and wherein the accessory arm is stowed in a retracted position close to the base, and an extended position when a bike is present in the bike rack with a bike tire resting on the tire tray and the accessory arm extends over the bike tire and holds the bike tire in the tire tray; and a determining device, configured to indicate when the accessory arm is in the extended position, wherein the determining device is mounted on the accessory arm such that when the accessory arm is in the extended position the determining device can communicate an accessory present signal as the accessory capacity determining device, and when the accessory arm is in the retracted position the determining device cannot communicate.

17. The bike rack of claim 16 wherein the determining device is an RFID tag.

18. The bike rack of claim 17 wherein the accessory arm comprises an arm sleeve, located radially around and enveloping the accessory arm and providing an RFID shield for a portion of the accessory arm that is enveloped, such that when the accessory arm is in the retracted position the tag location is in the portion and when the accessory arm is in the extended position the tag location is outside of the portion.

19. The bike rack of claim 18 wherein the RFID tag is configured to communicate the presence of an accessory in the accessory storage device to a tag reader.

20. The bike rack of claim 16 wherein the determining device is a sensor that generates an accessory present signal or an accessory not present signal.

21. The bike rack of claim 20 comprising a communicating device configured to communicate the accessory present signal or the accessory not present signal to a tag reader.

* * * * *